United States Patent
Yasui et al.

(10) Patent No.: US 6,356,264 B1
(45) Date of Patent: *Mar. 12, 2002

(54) IMAGE PROCESSING DEVICE AND IMAGE PROCESSING METHOD

(75) Inventors: Keisuke Yasui, Tokyo; Jun Okubo, Fujisawa, both of (JP)

(73) Assignee: Sega Enterprises, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,398

(22) Filed: Dec. 14, 1998

(30) Foreign Application Priority Data

Dec. 15, 1997 (JP) .............................. 9-345390

(51) Int. Cl.⁷ ............................................... G06T 15/60
(52) U.S. Cl. ....................... 345/426; 345/420; 345/421; 345/422
(58) Field of Search ................................ 345/422, 421, 345/426, 420

(56) References Cited

U.S. PATENT DOCUMENTS 5,043,922 A * 8/1991 Matsumoto .................. 345/422
5,870,097 A * 2/1999 Snyder et al. ............... 345/426

FOREIGN PATENT DOCUMENTS

JP          2-73479     3/1990

* cited by examiner

*Primary Examiner*—Mark Zimmerman
*Assistant Examiner*—Kimbinh T. Nguyen
(74) *Attorney, Agent, or Firm*—Dickstein Shapiro Morin & Oshinsky LLP

(57) ABSTRACT

According to the image processing method, when the number of shadow polygons existing between a depth position of pixels of ordinary polygons subject to shadowing and an infinite position is counted and that number is an odd number, those pixels are unconditionally judged to be positioned inside a region of shadow volume. Therefore, regions to undergo shadowing can be efficiently detected by judging whether the number is an odd number or an even number at all pixel positions.

4 Claims, 9 Drawing Sheets

SHADOW PROCESSING

FIG. 1  SHADOW PROCESSING

FIG. 3  POLYGON DATA
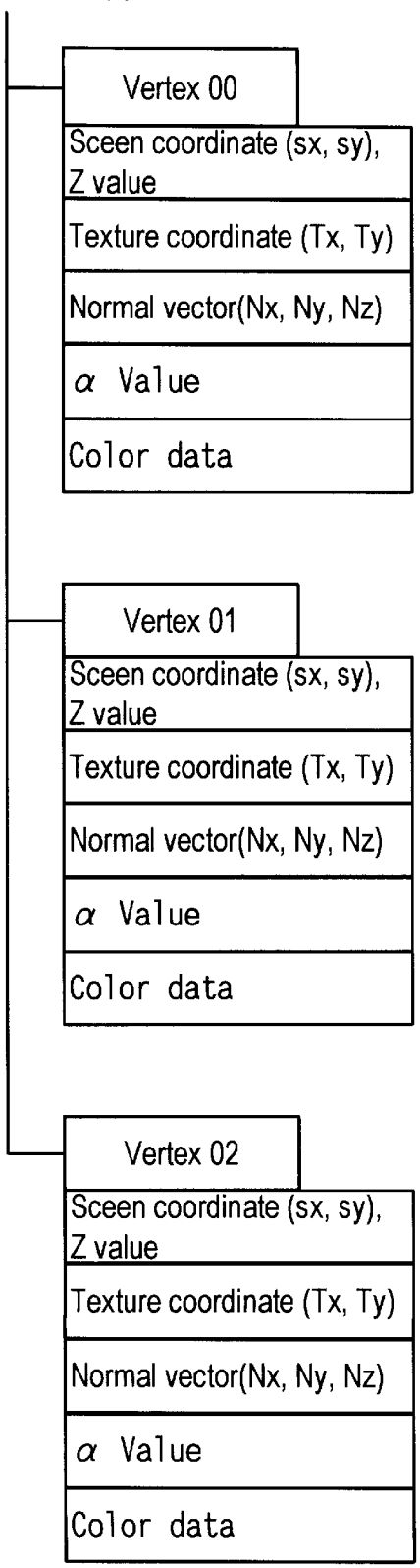
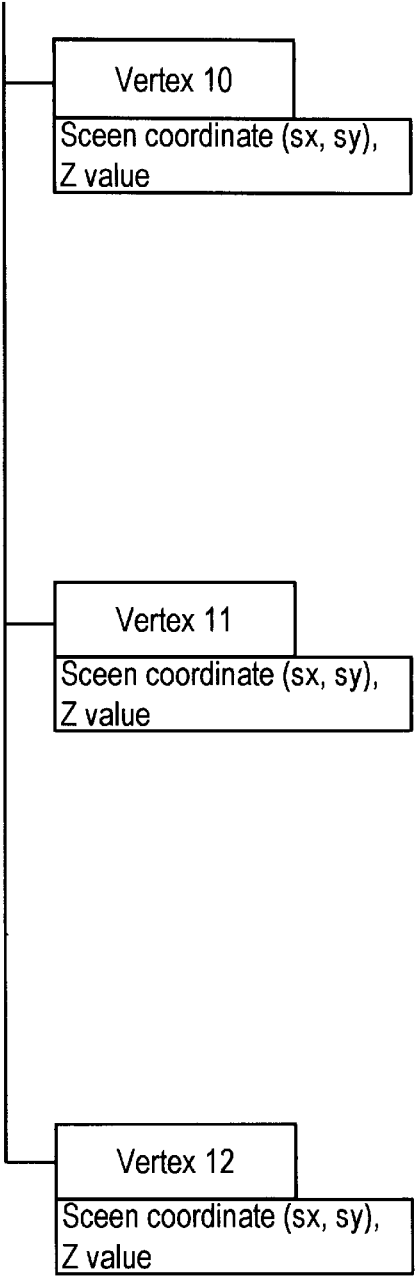

IMAGE PROCESSING DEVICE AND IMAGE PROCESSING METHOD

BACKGROUND OF THE INVENTION

1. Field of the Invention

The present invention relates to an image processing device utilized by a computer and in particular to an image processing device and method thereof that can efficiently determine a shadow region of an object.

2. Description of the Related Art

Shadow polygon methods have been proposed which allow a shadow of an object to be drawn utilizing hidden-surface cancellation processing hardware that uses the Z-value in image processing. For example, this method is proposed in unexamined patent publication, KOKAI HEI 2-73479. This type of shadow polygon method utilizes a virtual object for the purpose of shadow-casting. This is called shadow volume. A shadow volume is a shadow space produced by a light source and an object that shields the light. The inner side of this shadow volume is the region that becomes the shadow for an object and the outer side is the region irradiated by the light from the light source.

A shadow volume is a semi-infinite polyhedron and the plurality of sidewalls comprising this polyhedron are semi-infinite polygons called shadow polygons. Therefore, a shadow volume is comprised by a plurality of shadow polygons. The shadow polygons are handled in like manner to ordinary polygons thereby allowing shadowing.

FIG. 1 shows a shadow process utilizing shadow volumes and shadow polygons which comprise the shadow volumes. In this example, shadow volumes SV1, SV2 and SV3 are formed by means of blocking light from the light source by opaque polygons P1, P2 and P3. Because the light source is on the left side in the figure, shadow volumes SV1, SV2 and SV3 are generated on the right sides of opaque polygons P1, P2 and P3, respectively. Further, cross sections of the shadow volumes are shown in the figure. Therefore, shadow volume SV1 is formed by shadow polygons SP11 and SP12, shadow volume SV2 is formed by shadow polygons SP21 and SP22, and shadow volume SV3 is formed by shadow polygons SP31 and SP32.

At the present, the position of the view point is temporarily at view point 1 of a position outside the shadow volumes. In order to detect either the region of a shadow inside a shadow volume or the region irradiated by outside light, shadow polygons passing through in the direction of the Z-axis (direction of arrow) from view point 1 to a normal polygon are counted and then that count value is detected as either an even number or an odd number. As shown in FIG. 1, when view point 1 is positioned at the outer side of a shadow volumes, it is understood that if the count value is an even number, the region is outside a shadow volume and if the count value is an odd number, the region is inside a shadow volume.

Therefore, in order to judge whether the surface of a certain polygon is a region of a shadow, the number of shadow polygons existing in front of the position of that certain polygon, namely, between the position of that polygon and the position of the view point can be counted and then if that count value is an even number, the region is inside a shadow and if the count value is an odd number, the region is outside a shadow.

For example, if ordinary polygon OP exists intersecting shadow volume SV3 as shown in FIG. 1, two shadow polygons SP31 and SP32 exist between the a-b region of ordinary polygon OP and the view point 1. Because of this, the region a-b is judged to be a region outside shadow volume SV3. Furthermore, one shadow polygon SP32 exists between the b-c region of ordinary polygon OP and the view point 1. Because of this, the b-c region is judged to be a region inside shadow volume SV3. Even further, because no shadow polygons exist between the c-d region and the view point 1, the c-d region is judged to be a region outside shadow volume SV3.

As described above, shadow processing that utilizes shadow volumes and shadow polygons utilize a method similar to a hidden-surface cancellation method that uses Z-values, allowing the number of shadow polygons which exist between a certain polygon and a view point to be counted.

However, when the view point is positioned inside a shadow volume as seen by view point 2 in FIG. 1, if the number of shadow polygons between the view point 2 and the ordinary polygons is an odd number, the region is outside a shadow volume and if it is an even number, the region is inside a shadow volume. In other words, when the view point is positioned inside a shadow volume, the relationship between a region outside a shadow and a region inside a shadow for an odd number and an even number of polygons up to the view point is reversed compared to when the view point is positioned outside a shadow volume.

Therefore, in a conventional shadow processing method, it is necessary to judge whether the position of the view point is outside the shadow volume or inside the shadow volume. This judgment is, for example, necessary to carry out complicated calculations such as finding an equation of the surfaces of a shadow polygon. Further, depending on the results of the judgment, it must be necessary to change the relationship between the even/odd number of shadow polygons positioned between an ordinary polygon and an view point and whether the region is inside or outside a shadow.

SUMMARY OF THE INVENTION

Thereupon, the object of the present invention is to solve the above-mentioned conventional problems and provide an image processing device and method thereof that can carry out shadow processing to produce shadows with even more efficiency.

A further object of the present invention is to provide a recording medium that records a program that can carry out shadow processing to produce shadows with even more efficiency.

In order to achieve the above-mentioned objectives, provided is an image processing device comprising:

a pixel data generation step for generating position data and depth data in a display screen for pixels of first ordinary polygons, and generating position data and depth data in a display screen for pixels of shadow polygons which specify a shadow space produced by second ordinary polygon blocking light from a light source;

a step for storing the depth data for pixels the first ordinary polygons with the shortest depth at each pixel position;

a shadow determination step for detecting whether said shadow polygons exist between the stored depth position of pixels and an infinite position for each pixel position, detecting either an odd or even number of shadow polygons existing between the two positions, and determining that a shadow exists at said pixel when the number of shadow polygons is an odd number and;

a rendering step for carrying out a shadowing process for pixels judged to have shadow by said shadow determination step.

According to the image processing method above, when the number of shadow polygons existing between a depth position of pixels of ordinary polygons subject to shadowing and an infinite position is counted and that number is an odd number, those pixels are unconditionally judged to be positioned inside a region of shadow volume. Therefore, regions to undergo shadowing can be efficiently detected by judging whether the number is an odd number or an even number at all pixel positions.

Furthermore, in order to achieve the above-mentioned objectives, provided is an image processing device comprising:

a pixel data generation step for generating position data and depth data in a display screen for pixels of first ordinary polygons, and generating position data and depth data in a display screen for pixels of shadow polygons which specify a shadow space produced by second ordinary polygon blocking light from a light source;

a step for storing the depth data for pixels of the first ordinary polygons with the shortest depth at each pixel position;

a shadow determination step for detecting whether said shadow polygons exist between the stored depth position of pixels and an infinite position for each pixel position, and determining whether a shadow exists at said pixel in accordance with the number of shadow polygons existing between the two positions and;

a rendering step for carrying out a shadowing process for pixels judged to have shadow by said shadow determination step.

As described above, because it is possible to judge whether a shadow exists at a pixel in accordance with the number of shadow polygons existing between the stored depth position of pixels of first ordinary polygons and an infinite position, a shadowing process can be executed using a simple algorithm. In particular, when an infinite position is positioned inside a shadow volume, shadowing is carried out when the number of polygons detected above is an even number. Further, when an infinite position is positioned outside a shadow volume, shadowing is carried out when the number of polygons detected above is an odd number.

The present invention also includes and image processing device that executes the above-mentioned image processing method and a computer readable recording medium that records an image processing program to have a computer execute the image processing method.

BRIEF DESCRIPTION OF THE DRAWINGS

FIG. 3 shows an example of the composition of polygon data generated by geometry processing portion 18;

DESCRIPTION OF THE PREFERRED EMBODIMENTS

In the following, an embodiment of the present invention will be described with reference to the attached drawings. The technical scope of the present invention is not limited to this embodiment however.

In this embodiment, a shadow process that executes shadowing utilizes shadow volumes and shadow polygons which comprise the shadow volumes. Moreover, the shadow region is detected by means of comparing the Z-value of ordinary polygons which underwent shadowing and the Z-value of shadow polygons.

Figure 1:
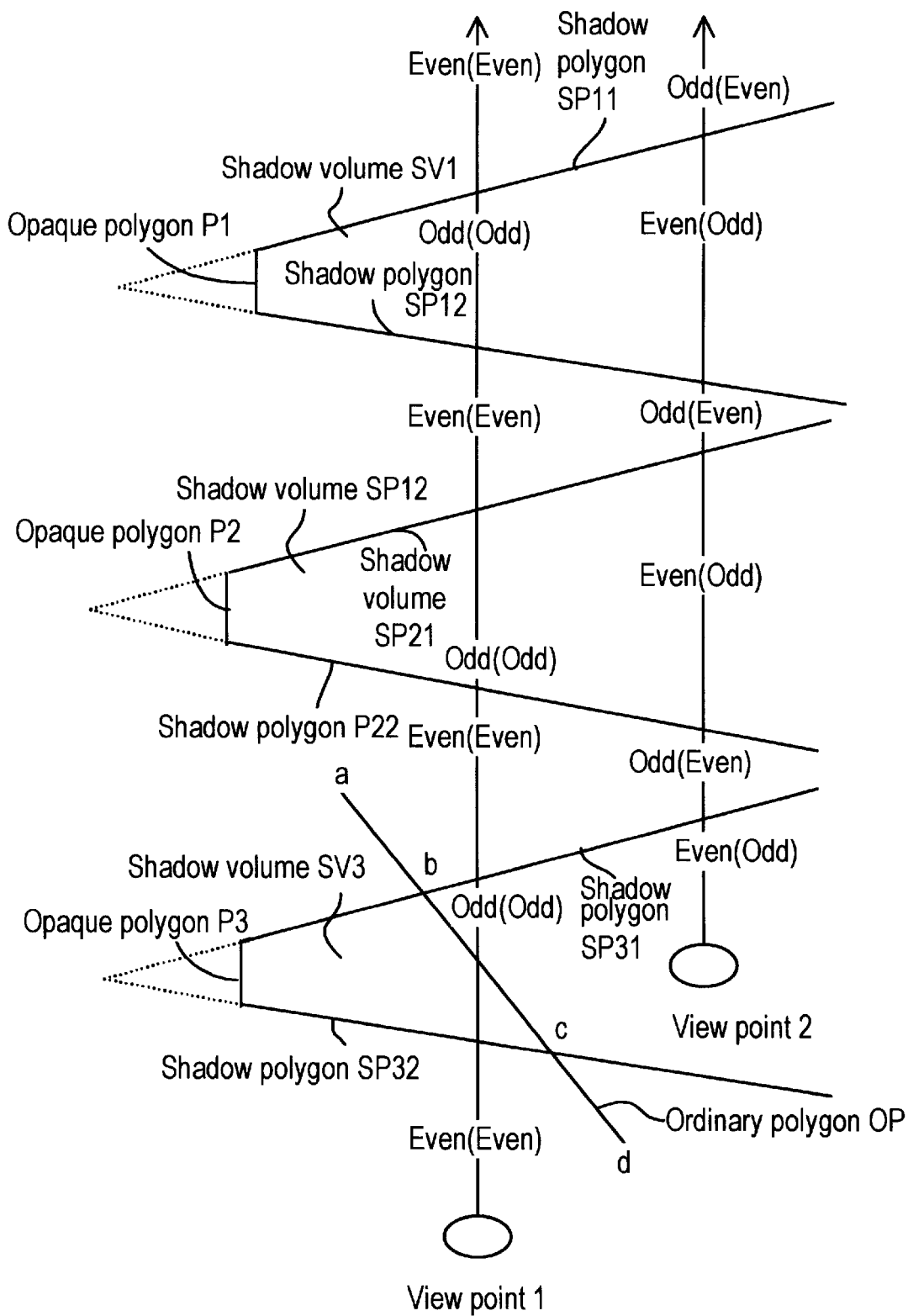
FIG. 1 shows a shadow process utilizing shadow volumes and shadow polygons which comprise the shadow volumes.

A embodiment of the present invention will be roughly described according to FIG. 1. In this embodiment the number of shadow polygons positioned between an ordinary polygon that underwent shadowing and an infinite point is counted and if that count value is an even number, the region is judged to be outside the shadow volume and if that count value is an odd number, the region is judged to be inside the shadow volume. In other words, the embodiment is premised on the fact that a shadow volume must be a closed space from an infinite point. As shown in FIG. 1, each shadow volume SV1 to SV3 is a shadow space extending to infinity in the direction towards the right side of the figure. Namely, a shadow space is closed in the upward direction of the figure (direction of Z-value). Therefore, an infinite position of a Z-value must be outside a shadow volume.

According to this method, even when the view point is outside a shadow volume or inside a shadow volume, if the number of shadow polygons between an ordinary polygon and an infinite point is an even number, the region can be uniformly judged to be outside a shadow volume and if the number is an odd number, the region can be uniformly judged to be inside a shadow volume. As shown by the odd number and even number designations written inside parenthesis in FIG. 1, the relationship between the odd number and the even number is the same for view point 1 and view point 2. Furthermore, a judgment as to whether shadow polygons are positioned between an ordinary polygon and an infinite point can be done by comparing a Z-value in like manner to the conventional example. In other words, when the Z-value of a pixel of a shadow polygon is larger than the Z-value of a pixel of an ordinary polygon, it can be judged, like a reverse hidden-surface processing, that a shadow polygon exists.

Figure 2:
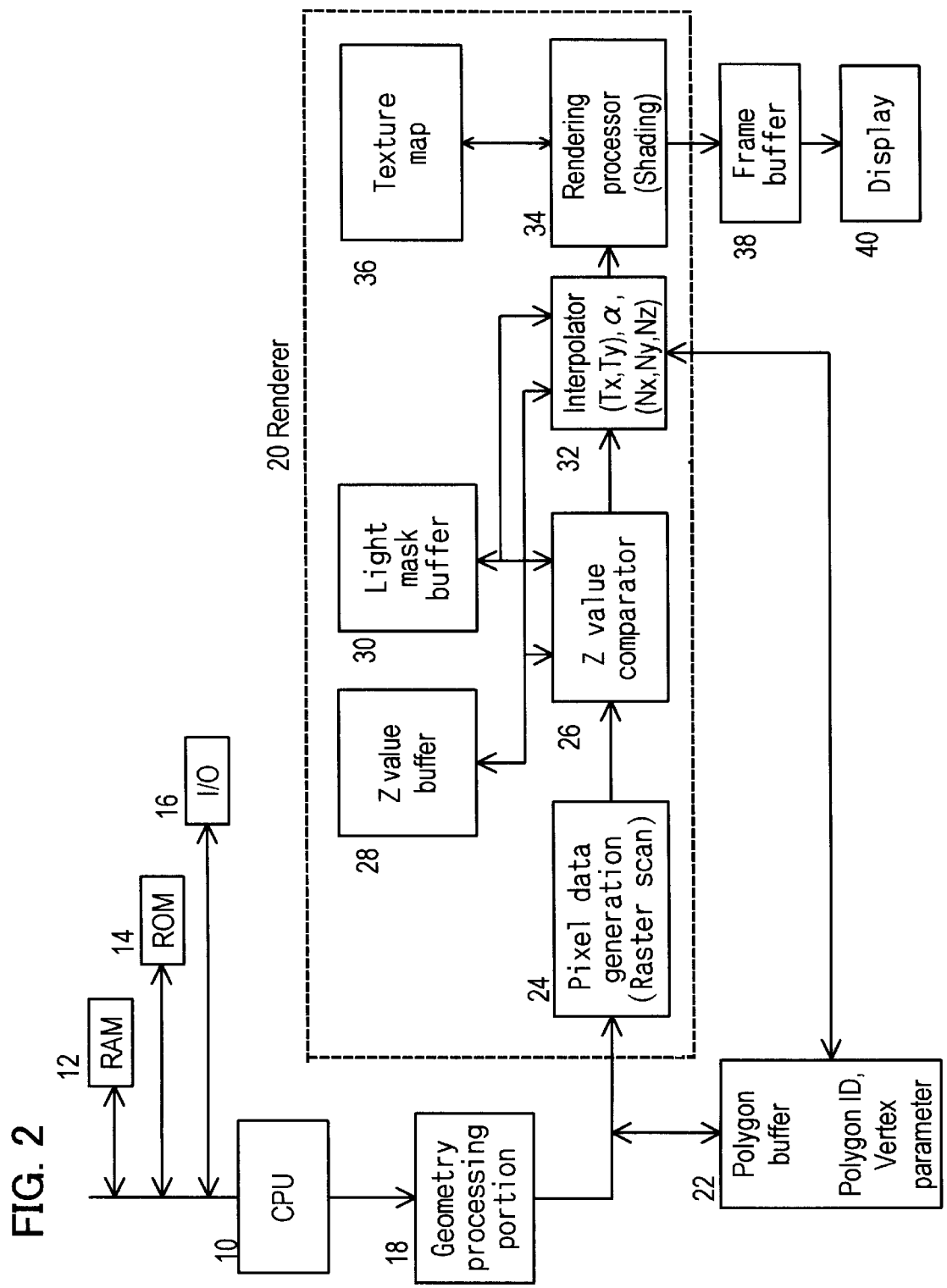
FIG. 2 shows the structure of the image processing device of the preferred embodiment.

FIG. 2 shows the structure of the image processing device of the preferred embodiment. CPU 10 executes an application program to generate images and then generates polygon data within a three-dimensional world coordinate system. Further, in order to carry out shadow processing, shadow polygon data is also generated comprising a shadow volume that is formed by light rays from a light source being blocked by an object. CPU10 is connected through a bus to RAM 12, ROM 14 and I/O portion 16 that inputs operation input information.

The polygon data generated by CPU 10 is supplied to geometry processing portion 18. In geometry processing portion 18, displaying polygons are determined by, for example, a clipping process and then the coordinate data of the polygons undergo perspective conversion from a three dimensional world coordinate system to a two-dimensional coordinate system of a display screen according to the position of the view point. Further, this polygon data is transferred to renderer 20 and then is stored in polygon buffer 22.

FIG. 3 shows an example of the composition of polygon data generated by geometry processing portion 18. FIG. 3 shows an example of a data composition of ordinary polygon OP such as a translucent polygon or an opaque polygon as well as an example of a data composition of a shadow polygon SP.

Ordinary polygon OP is comprised by parameters of three vertexes 00 to 01 which comprise a triangular polygon. The following representative values are included in the vertex parameters: a Z-value that indicates screen coordinates (sx, sy) and the depth within a display screen, texture coordinates (Tx, Ty) which function to transfer texture data representing the pattern of the surface of a polygon, normal vectors (Nx, Ny, Nz) of vertexes which function to carry out a process for the light source, $\alpha$ value indicating degree of transparency, and color data.

In contrast, in like manner, data of shadow polygon SP is comprised by parameters of three vertexes 10 to 12 which comprise a triangular polygon. Further, a shadow polygon is a virtual polygon so that it is not necessary for shadow polygon SP to be actually drawn. Therefore, the parameter data is sufficient if the screen coordinates and the Z-value that indicates depth are included. Moreover, as shown in FIG. 1, a shadow polygon is comprised by a semi-infinite polygon and if it undergoes a clipping process one time, will change to a finite polygon existing within the display screen.

Returning to FIG. 2, the composition of the image processing device will be described further. Pixel data generation portion 24 inside renderer 20 generates pixel coordinate data inside polygons from polygon data. The generation of pixel data is determined by linear interpolation calculations utilizing, for example, a raster scan method.

Figure 4:
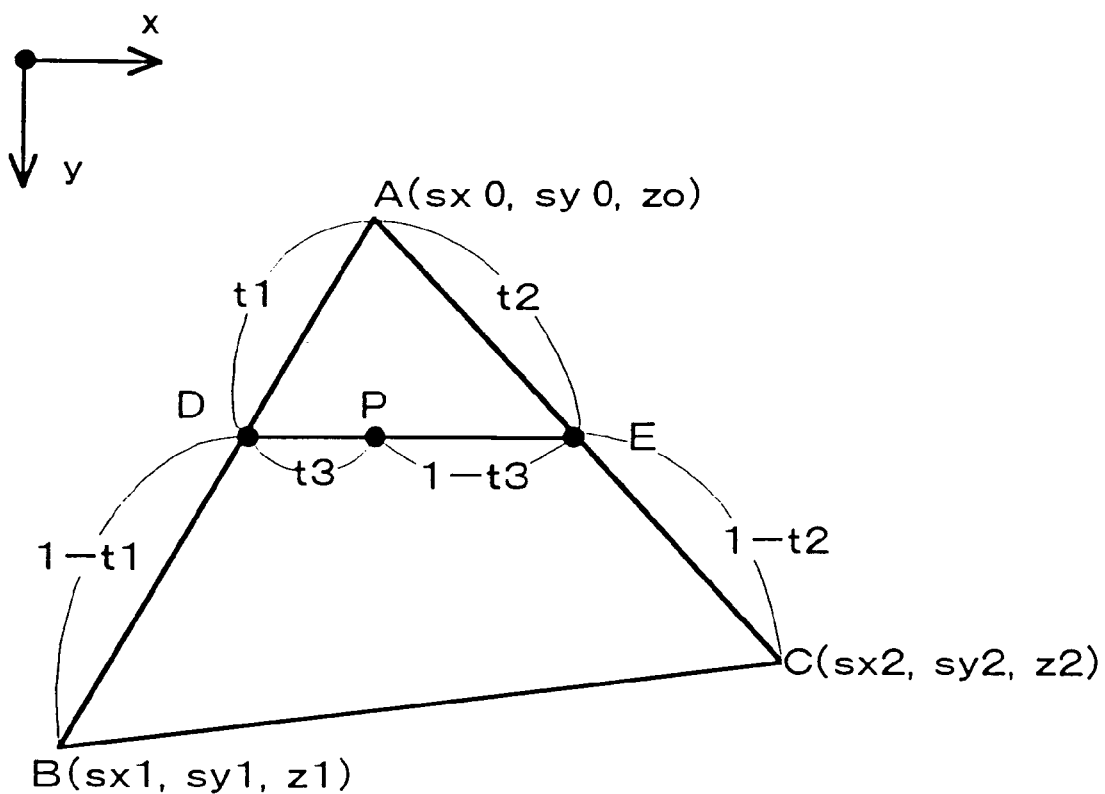
FIG. 4 shows a raster scan method.

FIG. 4 shows a raster scan method. Referring the example of a triangular polygon comprising vertexes A, B and C, a raster scan method sets the X-axis to the right direction of the display screen and the Y-axis to the downward direction of the display screen and then scans in the direction of the X-axis at each position of the Y-axis while successively moving in the direction of the Y-axis from vertex A. The screen coordinate values at pixel P and the Z-value are determined by linear interpolation calculations during the scan. Referring the example of FIG. 4, when the area between points D and E is scanned, screen coordinates of point D and point E and the Z-value thereof are determined initially. This calculation is determined by a linear interpolation method utilizing the segmentation ratio t1, t2 from the vertexes on both sides. Furthermore, the screen coordinates and the Z-value of pixel P are determined by a linear interpolation method utilizing the segmentation ratio t3 between points D and E.

It is not always necessary for the present invention to determine the screen coordinates and the Z-value of the pixels by a raster scan method. If there is another suitable calculation method, it can be utilized. For example, the position of pixels of a polygons can be detected by a fractal method proposed in Japanese Patent Application Number 9-305142 separately applied for by the applicants. The corresponding U.S. patent application No. is 09/184,240.

The screen coordinates and the Z-value of the pixels generated by pixel data generation portion 24 are supplied to Z-value comparator 26. The Z-value of the pixels to be displayed in the ordinary polygon are written into Z-value buffer 28. Thereupon, Z-value comparator 26 compares the generated Z-value of the pixels and the Z-value of the pixels to be displayed of the ordinary polygon which is previously written into Z-value buffer 28. For a case where Z-value comparator 26 carries out hidden-surface cancellation processing for an ordinary polygon, when the Z-value of the pixels is smaller than the corresponding Z-value inside the Z-value buffer 28, that generated Z-value is written into Z-value buffer 28 and the corresponding polygon ID is also written into Z-value buffer 28. For a case where Z-value comparator 26 carries out reverse hidden-surface cancellation processing for a shadow polygon, when the Z-value of the pixels is larger than the corresponding Z-value inside the Z-value buffer, count data inside light mask buffer 30 counts up one (1). Or, when the light mask buffer 30 records two values of data of one bit that distinguishes between an odd number and an even number only, that data converts from an odd number to an even number or from an even number to an odd number (hereinafter referred to as odd/even conversion).

As made clear from the above-mentioned description, the polygon ID and its Z-value which should be displayed for every pixel are recorded in Z-value buffer 28. Moreover, data of the counted number of shadow polygons or odd/even data for every pixel is recorded in the light mask buffer 30.

When hidden-surface cancellation processing of all ordinary polygons in one frame and reverse hidden-surface cancellation processing of all shadow polygons in the frame complete, texture coordinates (Tx, Ty), $\alpha$ value, and normal vectors (Nx, Ny, Nz) in each pixel are determined by an interpolation calculation based on vertex parameters in interpolator 32. Then, in rendering process portion 34, pattern data is read from texture map memory 36 according to texture coordinates for every pixel and then image data that includes color data is calculated. In the calculation of this image data, a shadowing process is carried out for pixels judged to be shadow regions by light mask buffer 30. Alternatively, processing for a light source is not carried out for the pixels. The processing for a light source is, for example, a Gouraud shading process that determines the inner product of normal vectors and vectors from a light source. This process determines, for example, the specular color and the diffused color of the pixels for a light source.

Image data determined by rendering process portion 34 is written into frame buffer memory 38. Then, after image data of one frame is recorded inside the frame buffer memory 38, that image data is supplied to display device 40 and is then displayed.

Figure 5:
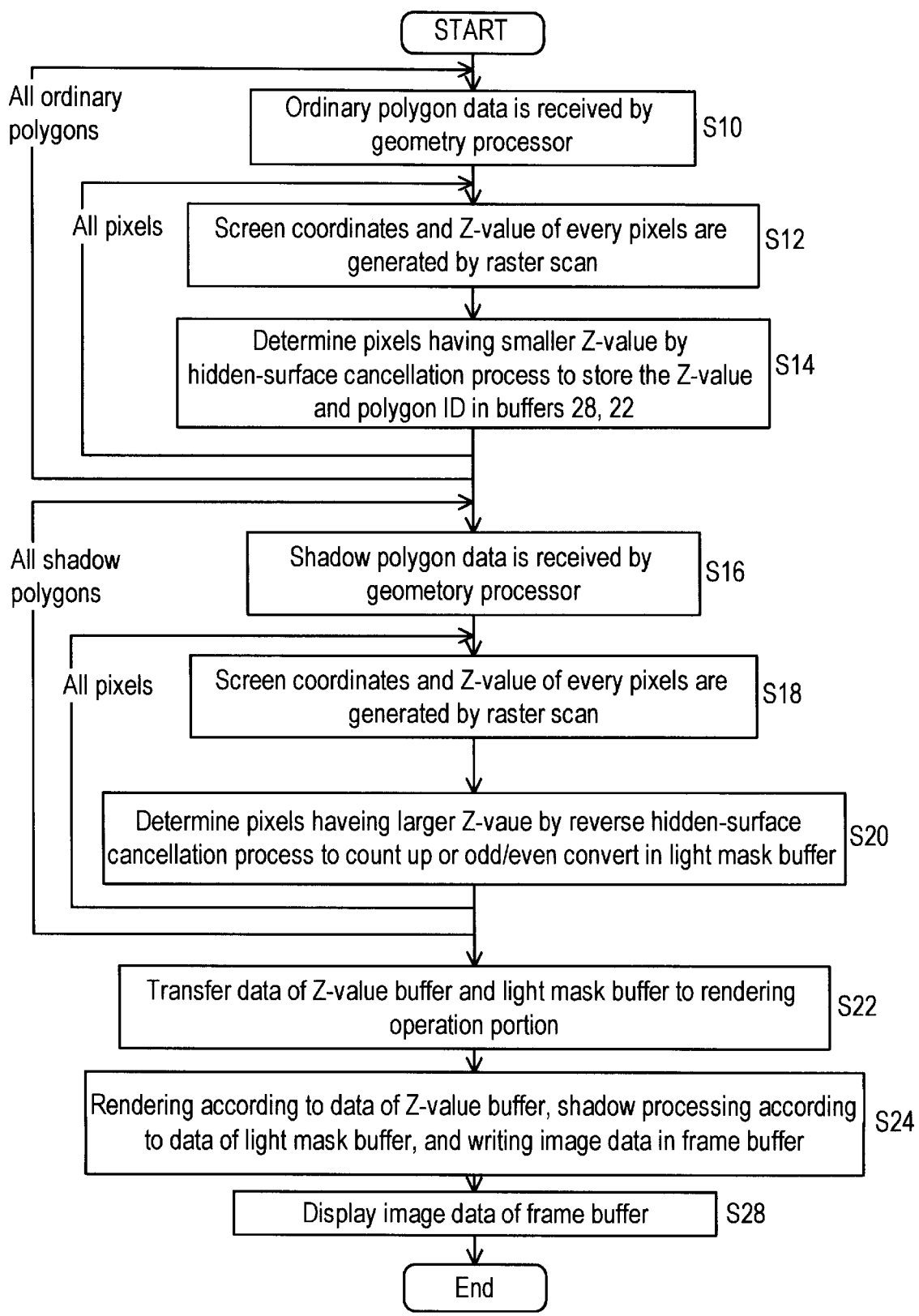
FIG. 5 is a flowchart of image processing that includes shadow processing of the preferred embodiment.

FIG. 5 is a flowchart of image processing that includes shadow processing of the preferred embodiment. At first, image processing of ordinary polygons is initially carried out. Hereupon, in order to simplify the explanation, the ordinary polygons are assumed to be opaque polygons. Renderer 20 receives ordinary polygon data from geometry processing portion 18 (S10). Then, screen coordinates and Z-values of every pixel are generated by a raster scan method in pixel data generation portion 24 (S12). Thereafter, Z-value comparator 26 compares the Z-value of the Z-value buffer to the Z-values of the pixels during processing. When the Z-values of the pixels are smaller, that Z-value is written into Z-value buffer 28 simultaneously with the polygon ID being written into Z-value buffer 28 as well (S14). The initial Z-value of Z-value buffer 28 is, for example, infinite and the Z-values and the polygon ID of the pixels located in front (smaller Z-value) in the display screen are stored inside Z-value buffer 28.

The above-mentioned steps S12 and S14 are carried out for all pixels of ordinary polygons and steps S10 to S14 are further carried out for all ordinary polygons. Next, shadow processing for the purpose of shadowing will be described.

At first, data of a shadow polygon comprising a shadow volume that defines shadow space is supplied from geometry processing portion 18 to renderer 20 (S16). Thereupon, screen coordinates and the Z-value of pixels inside the shadow polygon are generated by pixel data generation portion 24. Hereupon, the processing is carried out by the raster scan method described in FIG. 4 or a fractal processing method not shown in the figure.

The Z-values of pixels of a shadow polygon and the Z-values of pixels corresponding to an ordinary polygon recorded in Z-value buffer 28 are compared by Z-value comparator 26. When the Z-value of pixel of a shadow polygon is larger than the Z-value inside Z-value buffer 28, count value of corresponding pixel in the light mask buffer 30 counts up. Alternatively, odd number/even number data undergo odd/even conversion. Moreover, when the value of light mask buffer 30 is the count value, the initial value is a zero value, and when it is an odd number/even number data, the initial value is [0] indicating an even number. And, when the pixels of a shadow polygon are positioned between an ordinary polygon and an infinite point, that pixel is count or odd/even conversion is done.

Figure 6:
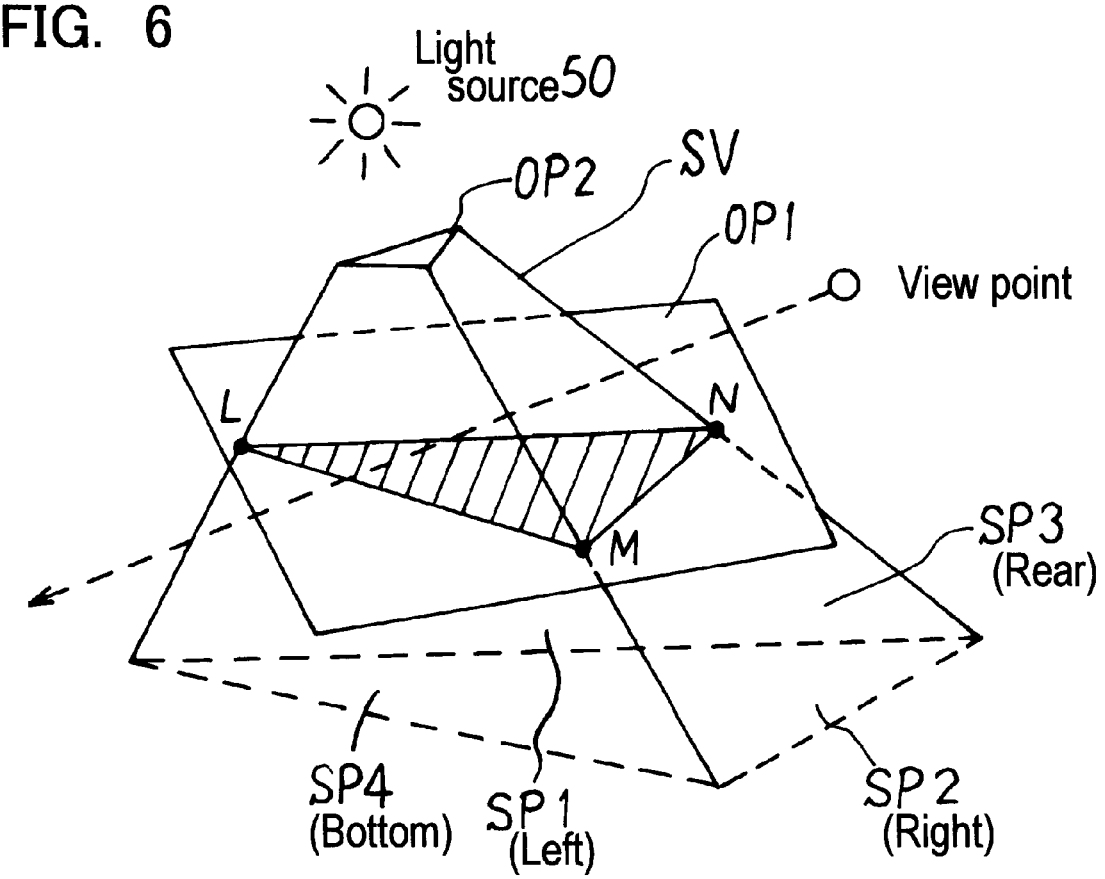
FIG. 6 shows changes in light mask buffer data when a shadow is formed by means of reverse hidden-surface processing of a shadow polygon.

The above-mentioned processes are clearly understood by referring to FIG. 6 to FIG. 9. FIG. 6 to FIG. 9 show changes in light mask buffer data when a shadow is formed by means of reverse hidden-surface processing of a shadow polygon. In any of these figures, the view point is at the upper portion of the plane on the paper and the direction of the line of sight is the direction facing the rear side of the plane on the paper as shown in FIG. 6. In the example shown in FIG. 6, a shadow (slashed line region L, M, N in the figure) is formed by a separate ordinary polygon OP2 on the surface of ordinary polygon OP1. In other words, shadow volume SV is shown that is formed by light source 50 and ordinary polygon OP2 blocking the light from light source 50. This shadow volume SV forms a triangular drill shape and comprises four shadow polygons SP1, SP2, SP3 and SP4. Further, this shadow volume SV is intersected by ordinary polygon OP1 in a region surrounded by points L, M and N.

Figure 7:
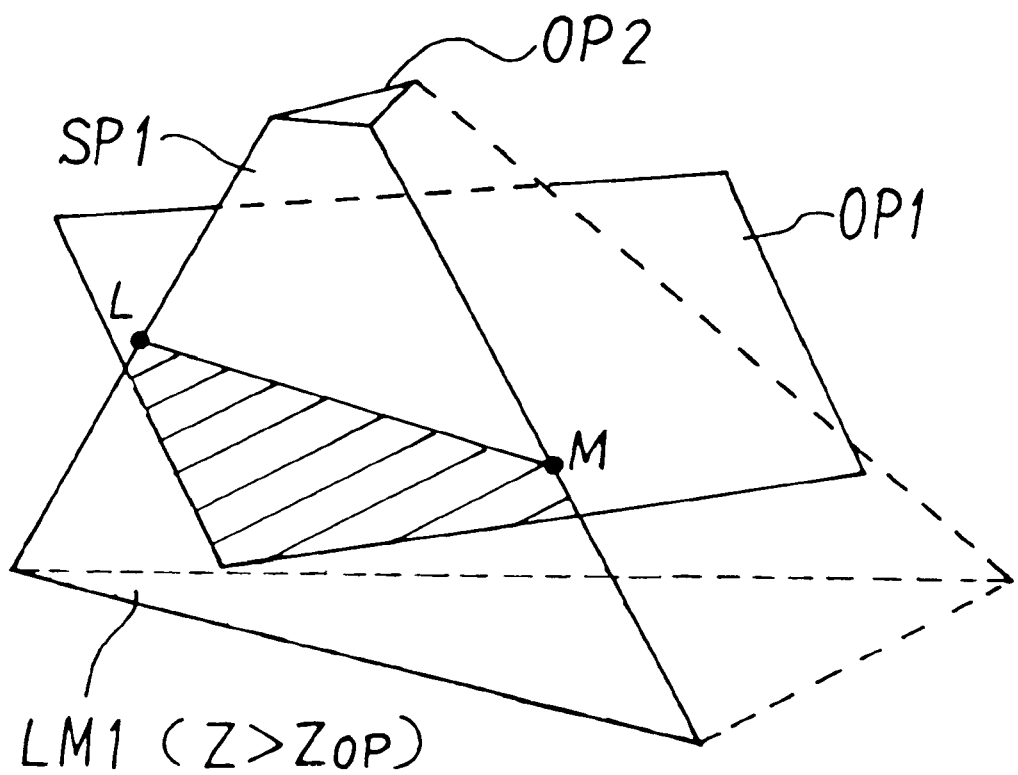
FIG. 7 shows changes in light mask buffer data when a shadow is formed by means of reverse hidden-surface processing of a shadow polygon.

Returning to the image processing flowchart of FIG. 5, if it is assumed that shadow polygon SP1 comprising shadow volume SV undergoes the processing in steps S16, S18 and S20, light mask buffer 30 counts up or odd/even conversion is carried out for the pixels of shadow polygon SP1 whose z-value is larger than the Z-value of ordinary polygon OP1, namely, for the pixels of the shaded line region positioned at the rear side in the display screen as shown in FIG. 7. Because the initial value of light mask buffer 30 is data indicating an even number, the region represented by the slashed lines of FIG. 7 is data indicating an odd number.

Figure 8:
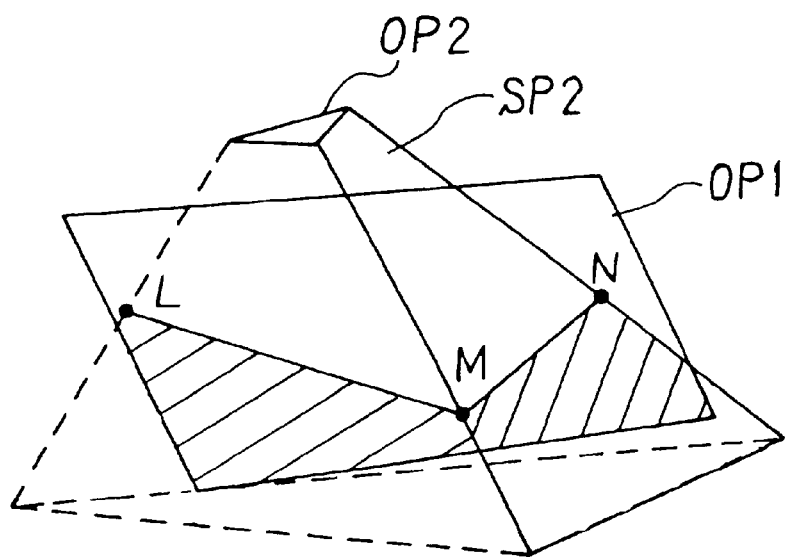
FIG. 8 shows changes in light mask buffer data when a shadow is formed by means of reverse hidden-surface processing of a shadow polygon.
Figure 9:
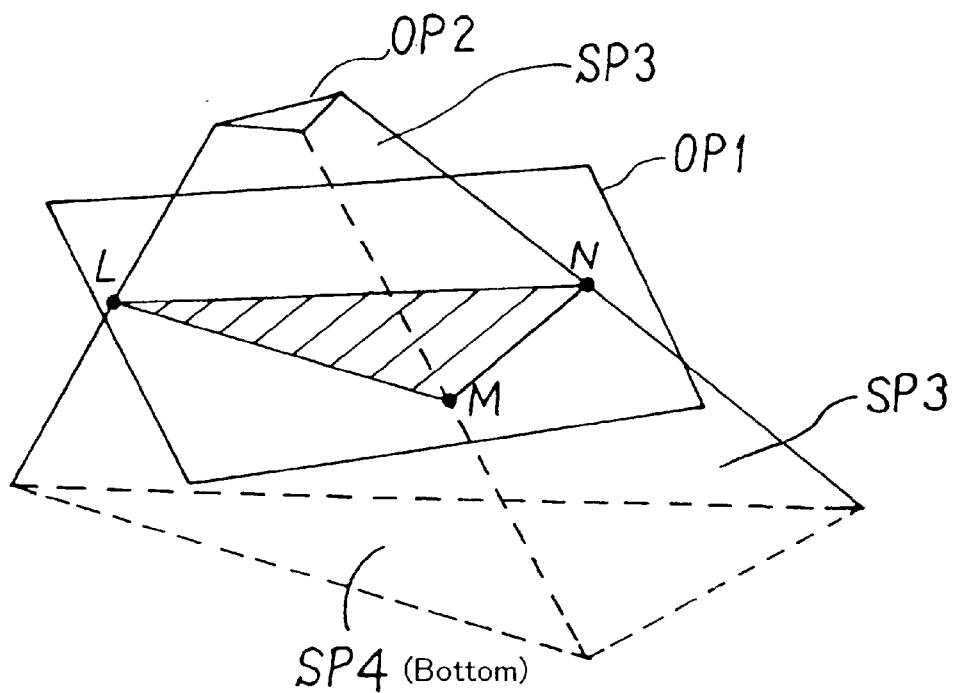
FIG. 9 shows changes in light mask buffer data when a shadow is formed by means of reverse hidden-surface processing of a shadow polygon.

When the processing of shadow polygon SP1 completes, the processes of steps S16 to S20 will execute for the next shadow polygon SP2 as shown in FIG. 8. When the Z-value of the pixels of shadow polygon SP2 is larger than the Z-value of Z-value buffer 28, the data of light mask buffer 30 counts up or it undergoes odd/even conversion. As shown in FIG. 8, for shadow polygon SP2 as well, light mask buffer 30 counts up or it undergoes odd/even conversion for the slashed line region (region defined by points M and N) on the rear surface side of ordinary polygon OP1.

Next, the processes of steps S16 to S20 will execute for the shadow polygon SP3 on the rear surface side. For this shadow polygon SP3, the data of light mask buffer 30 counts up or it undergoes odd/even conversion by a reverse hidden-surface process for the region underneath straight line LN. As a result, the count data of light mask buffer 30 for the region of triangle LMN is detected as an odd number or the odd number/even number data is detected as odd number data [1]. Further, the same processes mentioned above are finally carried out for shadow polygon SP4 of the bottom surface. In this process, because shadow polygon SP4 is positioned in front of an infinite point when the direction perpendicular to the plane of the paper is the line of sight direction, an odd/even conversion is not carried out for shadow polygon SP4.

When the processing of all shadow polygons completes, the data in light mask buffer 30 for the pixels which undergo shadowing is an odd number or odd number data [1]. Further, as previously described, it is not necessary to reverse the judgment of odd number/even number depending on whether the view point is inside a shadow volume or not.

When the processing of all ordinary polygons and shadow polygons for one frame completes, the data of Z-value buffer 28 and the data of light mask buffer 30 are transferred to interpolator 32 and rendering process portion 34 (S22). Interpolator 32 determines the parameters of each pixel using interpolation calculations from vertex data of polygon data recorded in polygon buffer 22 according to the polygon ID recorded inside Z-value buffer 28.

Image data is generated by rendering process portion 34, light source processing for the shadow region is canceled according to the data from light mask buffer 30 to reflect in the image data as a shadow region (S24). Then, that image data is written into frame buffer 38. Finally, the image is displayed in display device 40 according to the image data of frame buffer 38.

As described above, the shadow process of this embodiment utilizes shadow volumes and shadow polygons which comprise the shadow volumes to carry out reverse hidden-surface cancellation processing similar to a hidden-surface cancellation processing that uses a Z-value for an ordinary polygon, thereby allowing a judgment of whether pixels are in the shadow region irregardless of the position of the view point.

Figure 10:
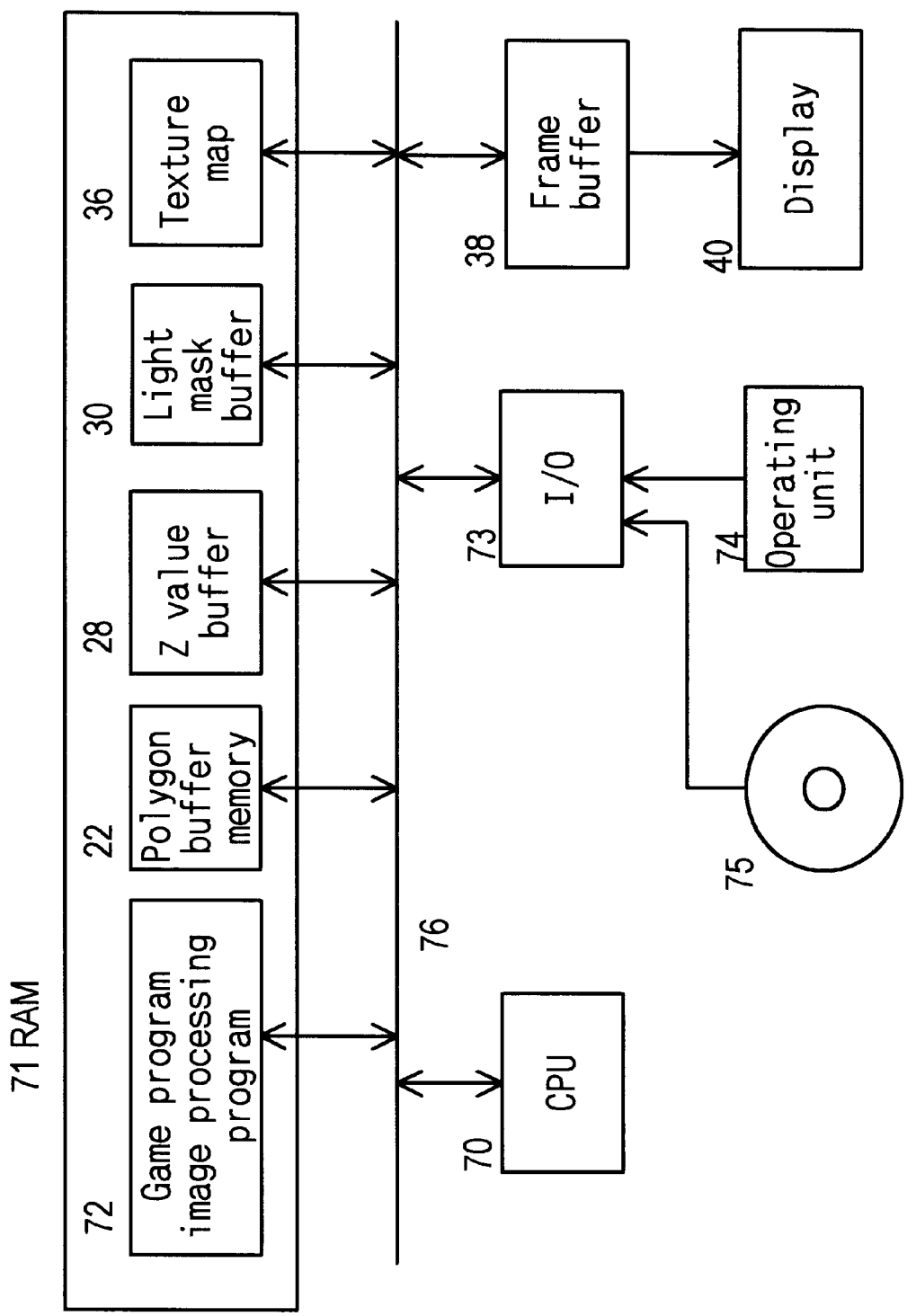
FIG. 10 shows an example of a structure when image processing of the preferred embodiment is carried out by software using a general-purpose computer.

FIG. 10 shows a compositional example when image processing of the preferred embodiment is carried out by software using a general-purpose computer. When carrying out image processing using a general-purpose computer, the calculations of the image processing are done in accordance with a program stored inside a recording medium. Therefore, by storing an image processing program on a computer readable recording medium, a general-purpose computer operates as a specialized image processing computer. Each procedure described in the above-mentioned flowchart is executed in the computer for the image processing program.

In the example of FIG. 10, CPU 70 and RAM 72 storing game programs and image processing programs which is provided inside calculation RAM 71 are connected to bus 76. Further, I/O portion 73 connected to bus 76 is connected to operating unit 74 operated by an operator and inputs operation signals therefrom. Even further, polygon buffer 22 that stores polygon data, Z-value buffer 28, light mask buffer 30, and texture map memory 36 are provided in the calculation RAM 71 for the image processing. Each of these are connected to bus 76. Even further, frame buffer memory 38 is connected to bus 76 and is also connected to external display device 40.

In this example, the image processing program is stored in RAM 72. However, other than this, an image processing program can be installed from recording medium 75, such as an external CDROM or magnetic tape, into RAM 71.

As described above, according to the present invention, in a shadow process that executes shadowing in an image process, shadow regions are efficiently detected by means of detecting the number of shadow polygons between an ordinary polygon and an infinite position irregardless of whether an view point is inside a shadow volume or not. Furthermore, because reverse hidden-surface cancellation processing is similar to hidden-surface cancellation processing that uses a Z-value of an ordinary polygon for the detection of a shadow region, hardware can be shared.

What is claimed is:

1. An image processing device comprising:
    a pixel data generation unit for generating position data and depth data in a display screen for pixels of first ordinary polygons, and generating position data and depth data in a display screen for pixels of shadow polygons which specify a shadow space produced by second ordinary polygon block light from a light source;
    a depth buffer for storing the depth data for pixels of the first ordinary polygons with the shortest depth at each pixel position;
    a shadow determination unit for detecting whether said shadow polygons exist between a depth position of pixels stored in said depth buffer and an infinite position for each pixel position, detecting either an odd or even number of shadow polygons existing between the two positions, and determining that a shadow exists at said pixel when the number of shadow polygons is an odd number without determining whether the viewpoint lies within a shadow and;
    a rendering process unit for carrying out a shadowing process for pixels judged to have shadow by said shadow determination unit.

2. An image processing device according to claim 1 wherein:
    said shadow determination unit detects whether the depth position of pixels of said shadow polygon exists at the depth side away from the depth position of pixels stored in said depth buffer, and then determine the existence of said shadow in accordance with the number of times that the existence of said depth position of pixels of said shadow polygon at said depth side is detected, when said detection for pixels of all shadow polygons is complete.

3. A method for image processing comprising:
    a pixel data generation step for generating position data and depth data in a display screen for pixels of first ordinary polygons, and generating position data and depth data in a display screen for pixels of shadow polygons which specify a shadow space produced by second ordinary polygon blocking light from a light source;
    a step for storing the depth data for pixels the first ordinary polygons with the shortest depth at each pixel position;
    a shadow determination step for detecting whether said shadow polygons exist between the stored depth position of pixels and an infinite position for each pixel position, detecting either an odd or even number of shadow polygons existing between the two positions, and determining that a shadow exists at said pixel when the number of shadow polygons is an odd number without determining whether the viewpoint lies within a shadow and;
    a rendering step for carrying out a shadowing process for pixels judged to have shadow by said shadow determination step.

4. A computer readable recording medium that records an image processing program code having a computer execute procedures, the procedures comprising:
    a pixel data generation procedure that generates position data and depth data in a display screen for pixels of first ordinary polygons, and generates position data and depth data in a display screen for pixels of shadow polygons which specify a shadow space produced by second ordinary polygons blocking light form a light source;
    a procedure that stores the depth data for pixels of the first ordinary polygons with the shortest depth at each pixel position;
    a shadow determination procedure that detects whether said shadow polygons exist between the stored depth position of pixels and an infinite position for each pixel position, detects either an odd or even number of shadow polygons existing between the two positions, and then determines that a shadow exists at said pixel when the number of shadow polygons is an odd number without determining whether the viewpoint lies within a shadow and;
    rendering procedure that carries out a shadowing process for pixels judged to have shadow by said shadow determination procedure.

* * * * *